May 9, 1961 R. E. RICHARDSON 2,983,635
MANUFACTURE OF LAMINATED SAFETY GLASS
Filed Nov. 8, 1956 13 Sheets-Sheet 1

Inventor
Ronald E. Richardson
By Cushman, Darby & Cushman
attorneys

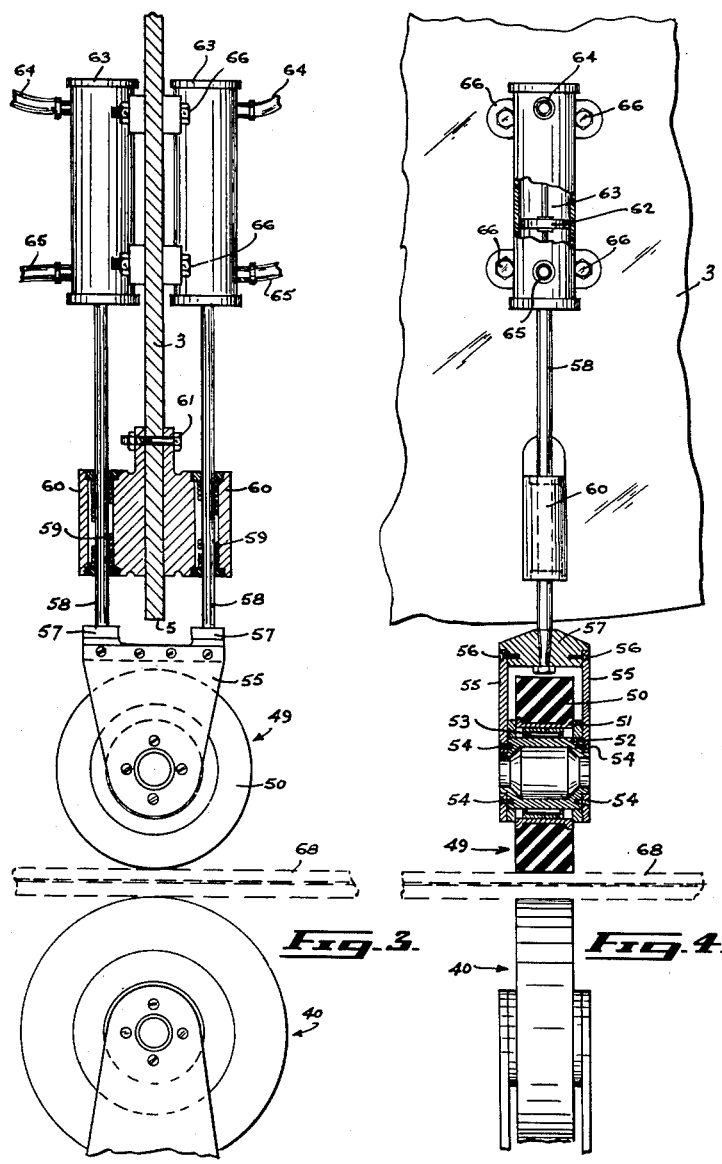

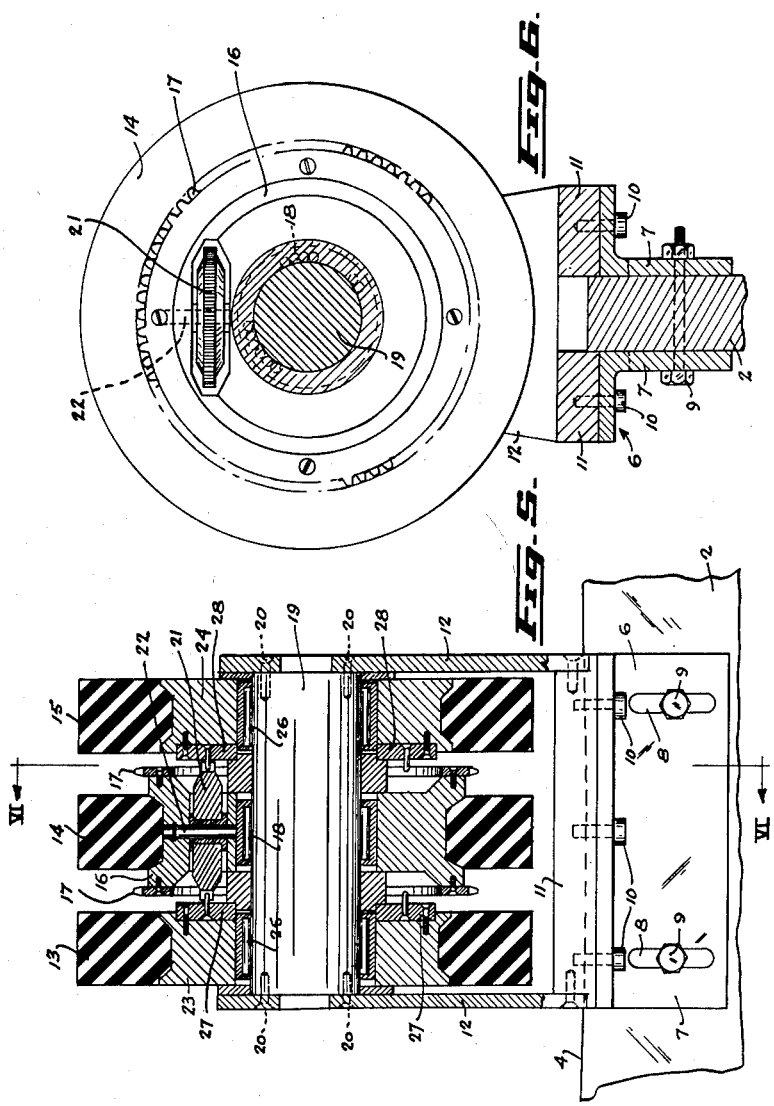

May 9, 1961 R. E. RICHARDSON 2,983,635
MANUFACTURE OF LAMINATED SAFETY GLASS
Filed Nov. 8, 1956 13 Sheets-Sheet 5
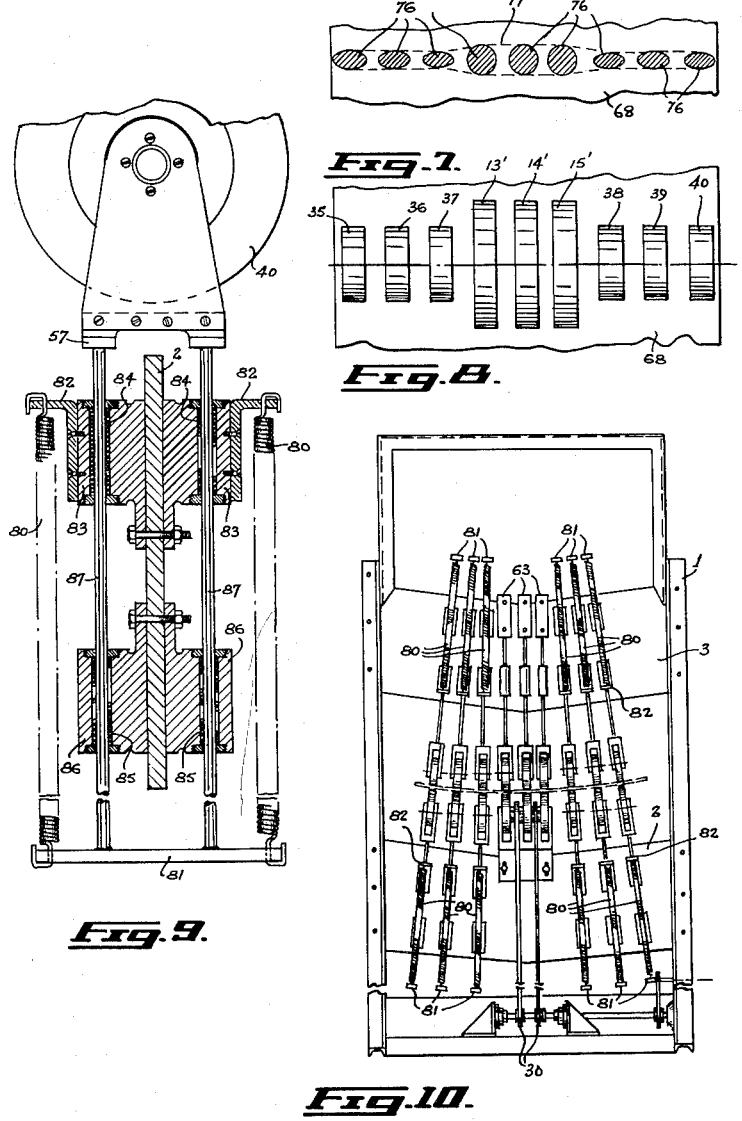
INVENTOR:
RONALD E. RICHARDSON
BY: Cushman, Darby & Cushman
ATTORNEYS

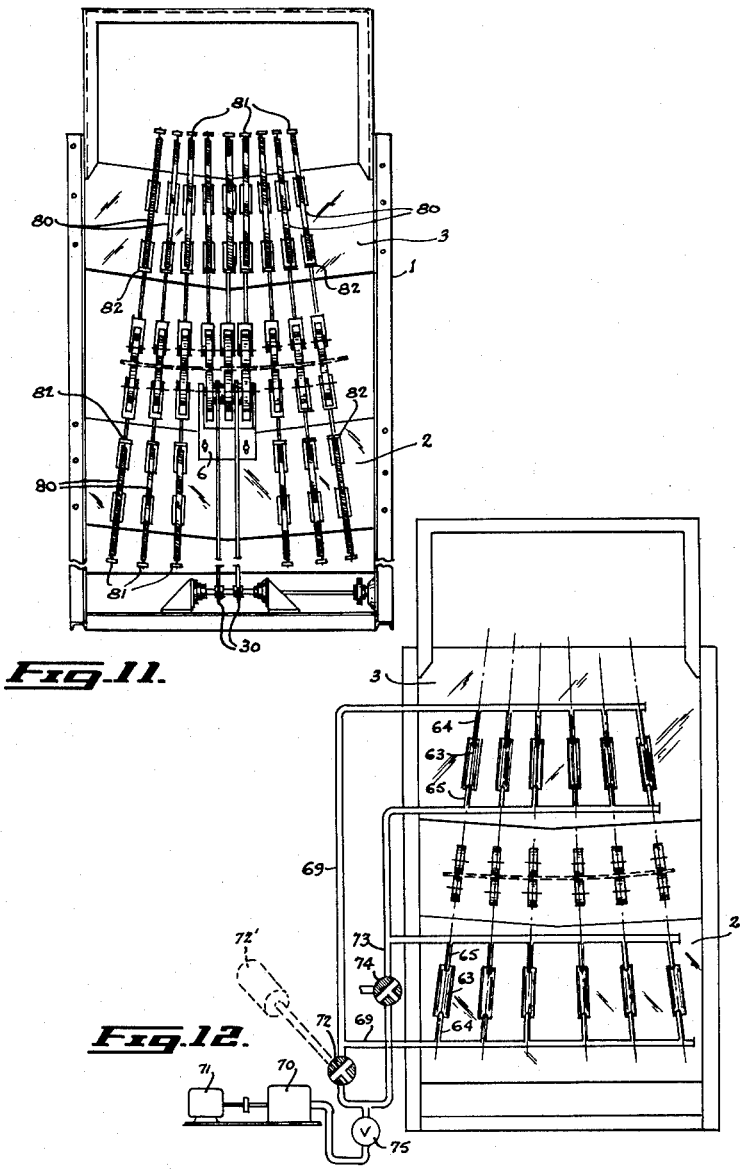

May 9, 1961    R. E. RICHARDSON    2,983,635
MANUFACTURE OF LAMINATED SAFETY GLASS
Filed Nov. 8, 1956    13 Sheets-Sheet 7
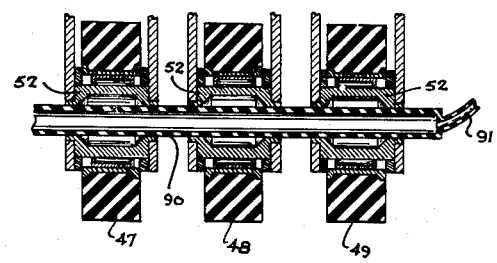
Fig.15.
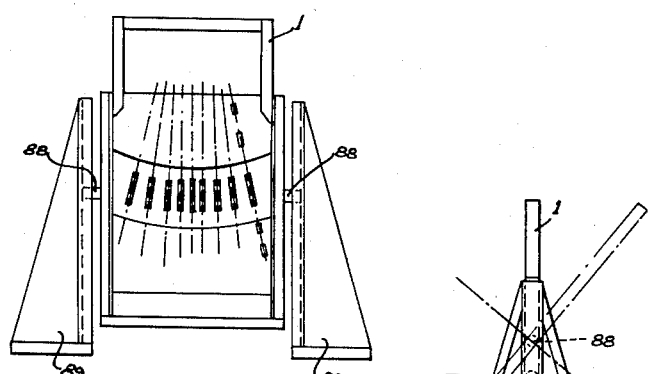
Fig.13.
Fig.14
INVENTOR:
RONALD E. RICHARDSON
BY: Cushman, Darby & Cushman
ATTORNEYS May 9, 1961 R. E. RICHARDSON 2,983,635
MANUFACTURE OF LAMINATED SAFETY GLASS
Filed Nov. 8, 1956 13 Sheets-Sheet 8

INVENTOR:

RONALD E. RICHARDSON

BY: Cushman, Darby & Cushman
ATTORNEYS

May 9, 1961 R. E. RICHARDSON 2,983,635
MANUFACTURE OF LAMINATED SAFETY GLASS
Filed Nov. 8, 1956 13 Sheets-Sheet 9
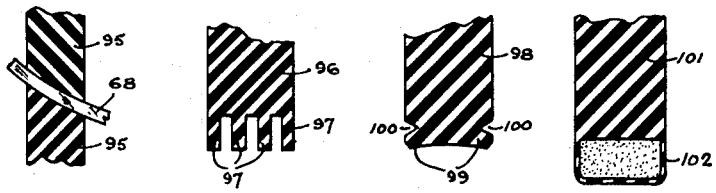
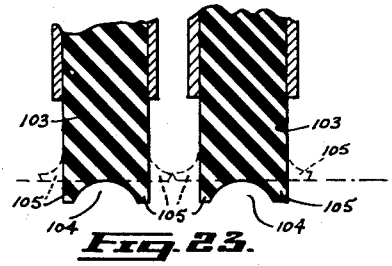
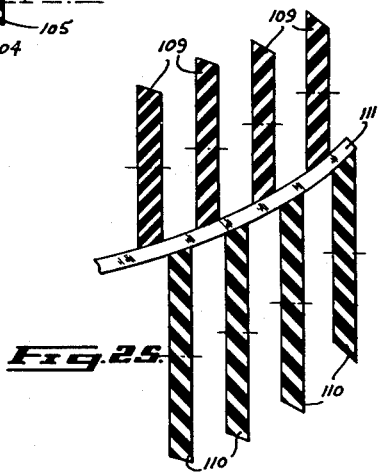
INVENTOR:
RONALD E. RICHARDSON
BY: Cushman, Darby & Cushman
ATTORNEYS May 9, 1961 R. E. RICHARDSON 2,983,635
MANUFACTURE OF LAMINATED SAFETY GLASS
Filed Nov. 8, 1956 13 Sheets-Sheet 10

INVENTOR:
RONALD E. RICHARDSON
BY: Cushman, Darby & Cushman
ATTORNEYS

May 9, 1961 R. E. RICHARDSON 2,983,635
MANUFACTURE OF LAMINATED SAFETY GLASS
Filed Nov. 8, 1956 13 Sheets-Sheet 11
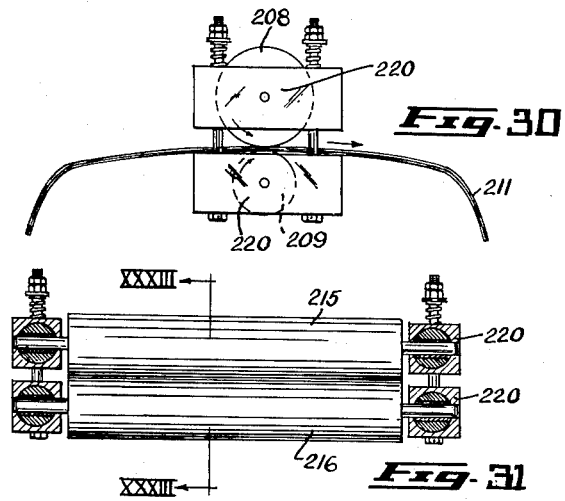
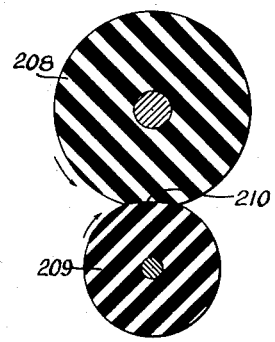
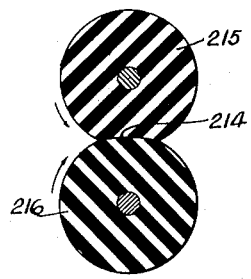
INVENTOR:
RONALD E. RICHARDSON
BY: Cushman, Darby & Cushman
ATTORNEYS May 9, 1961   R. E. RICHARDSON   2,983,635
MANUFACTURE OF LAMINATED SAFETY GLASS
Filed Nov. 8, 1956   13 Sheets-Sheet 12
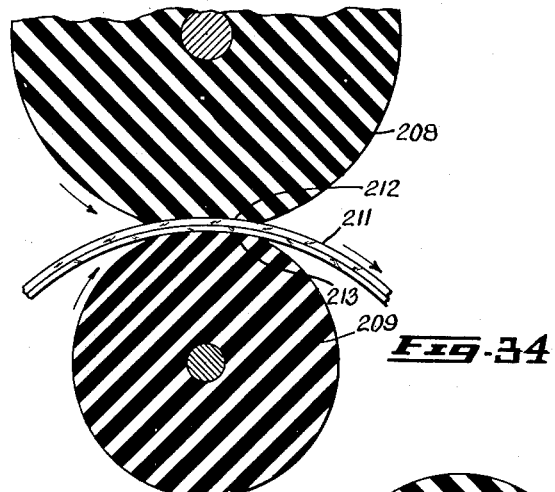
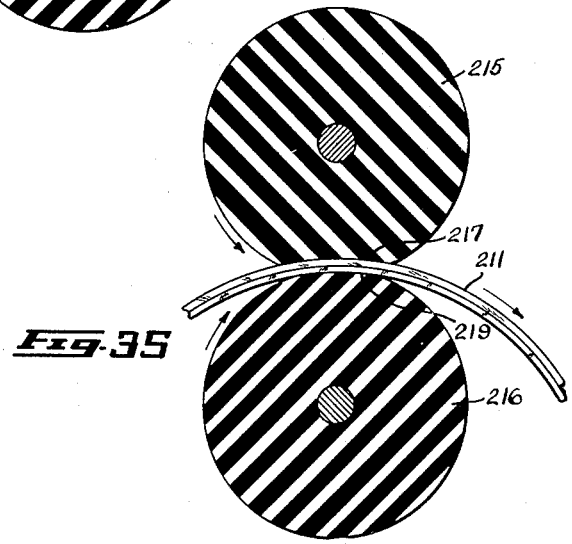
INVENTOR:
RONALD E. RICHARDSON
BY: Cushman, Darby & Cushman
ATTORNEYS

INVENTOR:
RONALD E. RICHARDSON

United States Patent Office 2,983,635
Patented May 9, 1961

2,983,635

MANUFACTURE OF LAMINATED SAFETY GLASS

Ronald E. Richardson, Oshawa, Ontario, Canada, assignor to Pittsburgh Plate Glass Company, Pittsburgh, Pa.

Filed Nov. 8, 1956, Ser. No. 621,054

Claims priority, application Canada Aug. 3, 1956

19 Claims. (Cl. 154—2.7)

This invention relates to improvements in certain preliminary steps involved in the manufacture of laminated safety glass, more particularly laminated safety glass panels of the type commonly used for automobile windshields and rear windows where the glass sheet is curved to conform to modern automobile design.

The type of windshield now widely adopted in automobile manufacture consists of a panel of laminated glass (a sandwich of two sheets of glass with a synthetic resinous interlayer) which extends uninterruptedly across the body of the automobile from side to side while being inclined backwardly at a substantial angle to the vertical.

The steps involved in the manufacture of laminated safety glass fall into a series of well-defined stages. Firstly there is a cutting stage where the glass is cut in the flat state. Then the glass is bent, usually by being passed through a bending lehr while supported on a curved mould, the two sheets of glass which are ultimately to be joined together always being bent together by being placed one on top of another on the mould thus ensuring that they conform accurately to each other's contour over their entire surfaces. The next stage is separation of the two bent sheets for the purpose of inserting the synthetic resinous interlayer. This is known as the stacking stage. A preliminary pressing stage then follows, this normally being carried out in a nipper roll press. Finally a main heat treating and sealing process is effected under pressure and at a high temperature in an autoclave. The foregoing are the principal steps. There are of course also finishing and trimming operations involved.

In one aspect this invention is concerned with improvements in nipper roll presses that are employed in the preliminary pressing stage.

By far the greatest single use for laminated safety glass is in the manufacture of windshields and other windows for automobiles. The modern trend in the design of automobile windshields and rear windows is towards the so-called "wrap-around" type in which the glass is in the form of an elongated sheet the central portion of which has a gentle curvature while the radius of curvature is sharply reduced at each end until the glass is extending almost perpendicular to the main body of the sheet. Attempts to press windshields of the wrap-around type in conventional nipper rolls has led to a large incidence of breakage. Proposals have been made to obviate this difficulty by modification of the design of the nipper rolls. For example, in United States patent application Serial No. 573,518, filed March 23, 1956, now Patent No. 2,948,646, there is disclosed a form of nipper roll which is divided transversely to the longitudinal axis of the roll into a number of independently rotatable sections. By this means some allowance is made for the differences between the speeds of the various sections of the surface across the glass sheet.

In the preferred form of such prior invention only one of the sections of the lower roll is driven, the remaining sections of that roll being caused to rotate solely by frictional contact between them and the glass surface. In an alternative construction, more than one of the roll sections may be positively driven, although provision may then be made for rotation of such sections at different speeds from one another, either by means of a differential gear mechanism interconnecting the roller sections, or by means of independent drives to each roller section.

The present invention is concerned with further improvements in a nipper roll press employing this sectionalized type of nipper roll construction.

In the past the design of automobile windshields and rear windows has normally called only for longitudinal bending of the glass, there having been no significant transverse curvature of the glass, that is to say in the direction extending from the top to the bottom as mounted as a windshield in an automobile. The design of windshields and rear windows has now advanced to the stage where curvature transverse to the direction of travel of the glass through the rolls is specifically called for, in addition to the longitudinal curvature.

It will be appreciated that such transverse curvature provides further difficulties in the construction of nipper rolls that will adequately carry out a preliminary pressing operation exerting sufficient pressure on the glass and plastic sandwich to eliminate air pockets from between the plastic interlayer and the two sheets of glass and to provide at least a temporary bond between the three layers preparatory to the final pressing step.

A further object of the present invention is thus to provide a nipper roll press that will, in addition to providing an improved operation when used for pressing glass having no transverse curvature, be especially suitable for pressing glass which does have such a transverse curvature.

It is a still further object of the invention to provide a press especially adapted to accommodate variations in the transverse contour of the glass in the longitudinal direction.

The types of glass bending moulds employed fall broadly into two categories, concave and convex, depending upon whether the glass is cradled within a concavely bent mould or whether it is wrapped over a convexly bent one. The tendency in the industry at the present time is to favour the use of concave moulds in which the glass is bent to have its concave surface uppermost. In addition to other advantages this type of mould provides the bent glass in the most convenient orientation for subsequent handling. Clearly it is more convenient to handle a sheet of bent glass when it is lying on its back. It can be readily passed along conveyors and laid on tables without any large pressures being exerted on the glass, or there being any great likelihood of the edges becoming chipped. The same convenience would not appear to exist when the glass is inverted to have its concave surface facing downwardly, since the two end "ears" of the glass will tend to prevent ready transportation and will be a constant source of potential damage to the glass. These ears are often pointed, which will render it virtually impossible for the bent glass sheets to stand unsupported with their convex surfaces uppermost.

Largely for these reasons it has in the past been the practice to take the glass after it has left the mould and been allowed to cool somewhat and pass it to the laminating stage on a conveyor with the sheets lying concave surface uppermost. On the glass entering the laminating room (a separate room is necessary because temperature and humidity must be controlled to avoid damage to the interlayer material) the operator lowers a pair of suction cups onto the upper glass sheet, applies a vacuum, raises the device supporting the suction cups and thus elevates the upper sheet of the pair. The operator then takes an elongated panel of the appropriate synthetic resinous material which will form the interlayer in the finished product and which will already have been cut to shape. A typical such material would be plasticized polyvinyl butyral. He then lays this sheet of material on the lower sheet of glass preparatory to relowering the upper sheet of glass.

Some difficulty has at times been experienced in carrying out this operation due to the fact that the operator is required to lay a flat thin sheet of loose flexible plastic material on a curved glass surface while avoiding any wrinkles in the plastic sheet. This task is made more difficult by the fact that the two ends of the glass are sharply bent and project upwardly, almost vertically in some windshield designs. The operator is not only called upon to smooth out the interlayer sheet and avoid any wrinkles, but also to ensure that it remains accurately in place until it is sandwiched between the two sheets of glass. This involves skill in coordinating the lowering of the upper glass sheet with the holding in place of the interlayer. It may even give rise to the need for two operators to carry out the operation successfully.

It is a further object of the present invention to provide a method of manufacturing laminated safety glass in which this difficulty is avoided.

As previously explained, after the stacking stage the glass sandwich is passed to a nipper roll press where it is given a preliminary pressing treatment. The pressure exerted on the glass by this press is sufficient to squeeze out substantially all the air trapped between the surfaces and to produce at least a temporary seal between the sheets so that thereafter the glass panel may be safely handled as a single unit without danger of the sheets becoming separated.

For the reasons above set out, it has been the practice to present the glass to the nipper roll press with its concave surface uppermost, and the design of nipper roll presses has developed on the assumption that when curved panels are to be rolled they will be so oriented. As a result existing nipper roll presses are unsuited to receiving curved glass in any other way but with its concave surface uppermost, which fact has had the tendency of crystallising the tradition that it should always be rolled in that manner.

The basic concept of this aspect of the present invention lies in the belief that these limitations, although they have become universally adopted, are not only unnecessary, but in many instances lead to undesirably complicated processing and handling of the glass. The present invention thus asserts the hitherto unacceptable contention that there is no disadvantage and in many instances a decided advantage to be gained from handling the glass convex surface uppermost through at least the stacking and preliminary pressing stages of the process. For this purpose it is necessary to construct a nipper roll press suited to receive such "inverted" glass. Although this requirement can be met by no more than the mere inversion of a pair of conventional nipper rolls, the features that flow from such change react favourably on the previous steps of the process.

Once the practicability of handling the glass sheets with their convex side uppermost is appreciated, it immediately becomes apparent that a much simplified preliminary stacking step will result. The operator who has the duty of placing the interlayer sheet between the two glass sheets will be dealing with a convex surface. He will thus be faced with the task of smoothing and maintaining in place a flexible sheet over a surface against which the sheet will have a natural tendency to lie and remain in place. In contradistinction to the prior form of operation in which the edges of the interlayer sheet extended upwardly, when the operation is carried out with the glass inverted, the edges of the flexible sheet will extend downwardly and tend to remain in place by virtue of their own weight.

Further elucidation may be obtained from the accompanying drawings which illustrate examples of how the invention may be carried into practice.

Fig. 3 is a fragmentary side view taken generally on the line III—III in Figure 1 of part of this press showing on an enlarged scale and partly in section the construction and mounting of a pair of nipper roll sections;

Fig. 4 is a front view of the assembly seen in Fig. 3;

Fig. 5 is a front view of a further fragment of the press seen in Fig. 1, illustrating the driving sections of the lower roll;

Fig. 6 is a section along the line VI—VI in Fig. 5;

Fig. 7 is a diagram illustrating a pressure pattern;

Fig. 8 is a diagrammatic representation of a series of roll sections that would produce such a pattern;

Fig. 9 is a fragmentary side view showing a modified manner of mounting a roll section;

Fig. 10 is a front elevation of a whole press partially embodying the modification of Fig. 9;

Fig. 11 is a front elevation of a whole press fully embodying the modification of Figure 9;

Fig. 12 is a diagrammatic representation of a press such as the one shown in Figure 1, demonstrating the pneumatic system;

Fig. 13 is a small scale diagrammatic front view of an entire press showing the same movably mounted in a supporting frame;

Fig. 14 is a side view of Fig. 13;

Fig. 15 is a fragmentary view of three roll sections illustrating an optional additional feature;

Fig. 19 illustrates by a fragmentary sketch the manner in which the peripheral surface of a pair of co-operating roll sections may be shaped to conform to the contour of the glass surface being rolled;

Fig. 20 illustrates a fragment of a roll section demonstrating a further modification to the peripheral surface thereof;

Fig. 21 illustrates a modification to Figure 20;

Fig. 22 shows a fragmentary portion of a roll section illustrating a still further modification;

Fig. 23 shows fragmentary portions of a pair of adjacent roll sections having further modified peripheral surfaces;

Figure 1:
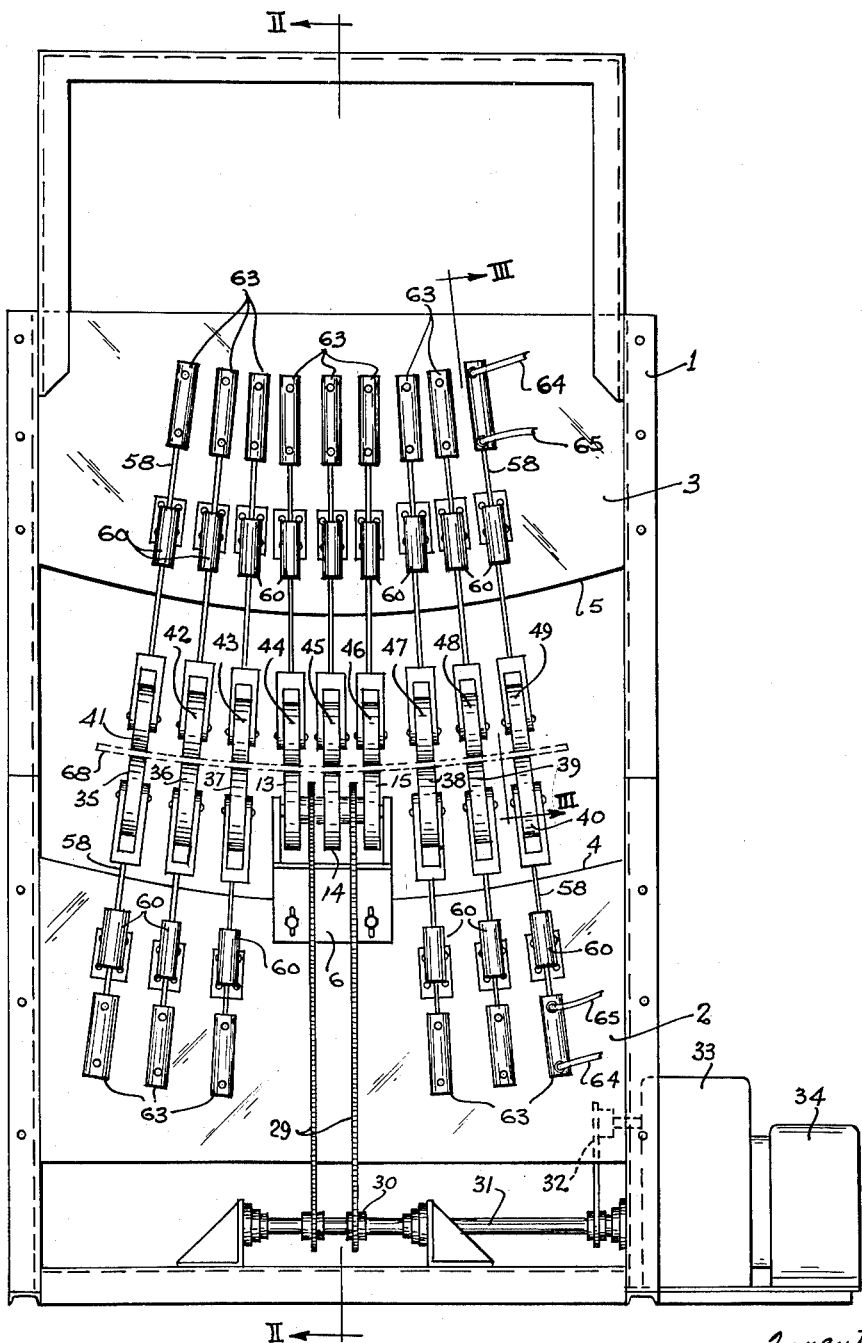
Fig. 1 shows a front elevation of an entire press.
Figure 24:
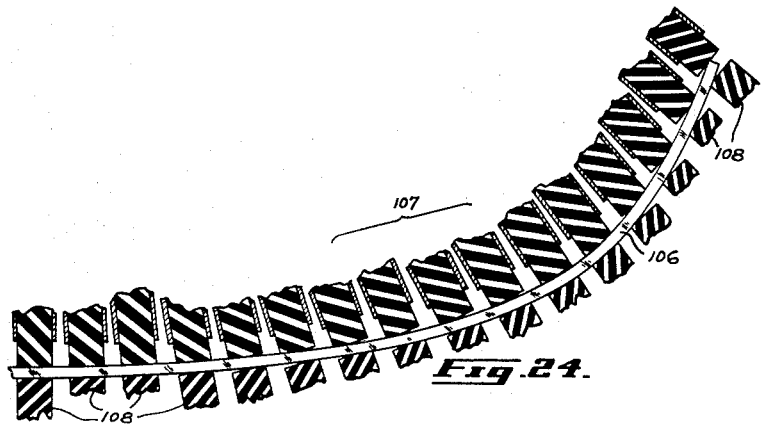
Figure 26:
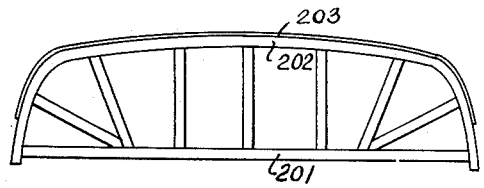
Figure 27:
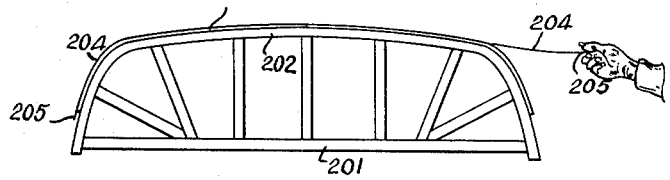
Figure 28:
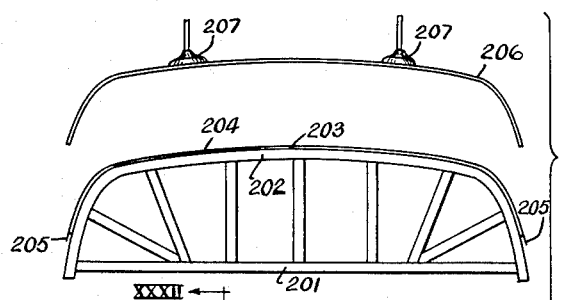
Figure 29:
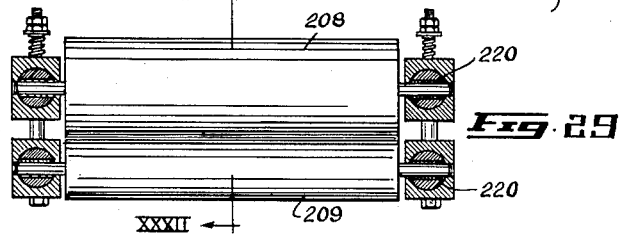
Figure 36:
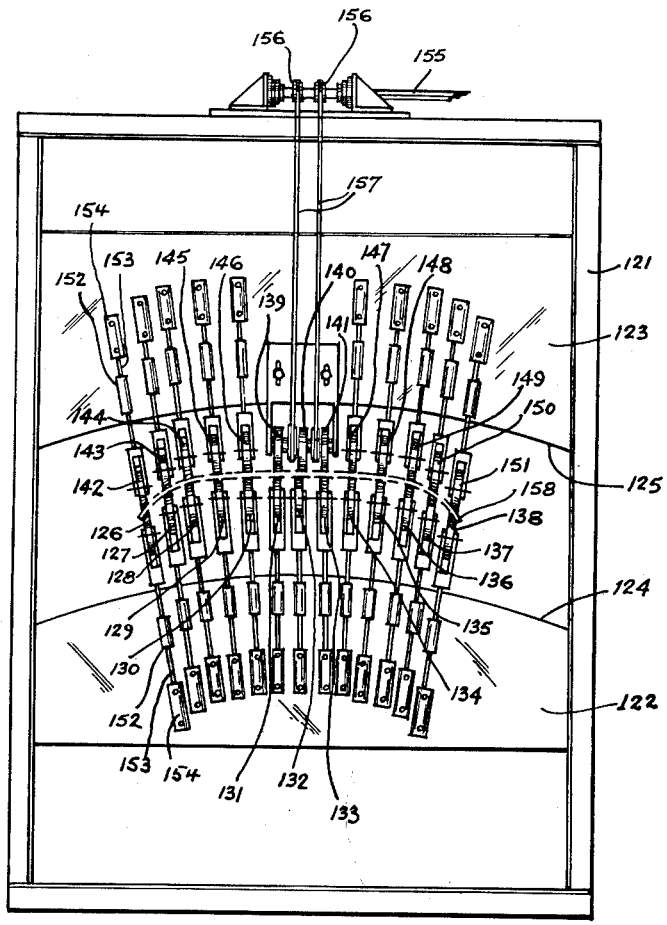

Fig. 24 demonstrates by a further diagrammatic representation the manner in which the invention may be applied to a press adapted to receive an elongated glass sheet in the transverse direction;

Fig. 25 is a further sketch demonstrating diagrammatically the manner in which opposed roll sections may be arranged in a staggered configuration;

Fig. 26 shows a diagrammatic side view of a single sheet of glass arranged convex side uppermost and supported by a wooden frame;

Fig. 27 is a view similar to Figure 26 showing an interlayer sheet being placed thereon;

Fig. 28 is a view similar to Figure 27 a moment later showing the process further advanced with a second sheet of glass being lowered into position;

Fig. 29 is a simplified view of a conventional nipper roll press modified to receive glass with its convex surface uppermost in accordance with the present invention;

Fig. 30 is a side view of the nipper rolls of the press seen in Figure 29 showing a windshield in process of being pressed;

Fig. 31 is a view similar to Figure 29 but showing a modification;

Fig. 32 is an enlarged section of the nipper rolls of Figure 29 taken on the line XXXII—XXXII in Figure 29;

Fig. 33 is an enlarged section through the nipper rolls of Figure 31, taken on the line XXXIII—XXXIII in Figure 31;

Figure 34 is a further enlarged and fragmentary view of the jaws of the nipper rolls of Figures 29 and 32, illustrating diagrammatically the manner in which these rolls perform while carrying out a pressing operation;

Fig. 35 is a further enlarged fragmentary view generally similar to Figure 34 but illustrating the nipper rolls of Figures 31 and 33; and Fig. 36 is a front elevation of a whole press similar to Figure 1 modified to embody certain features of the latter figures.

Figure 2:
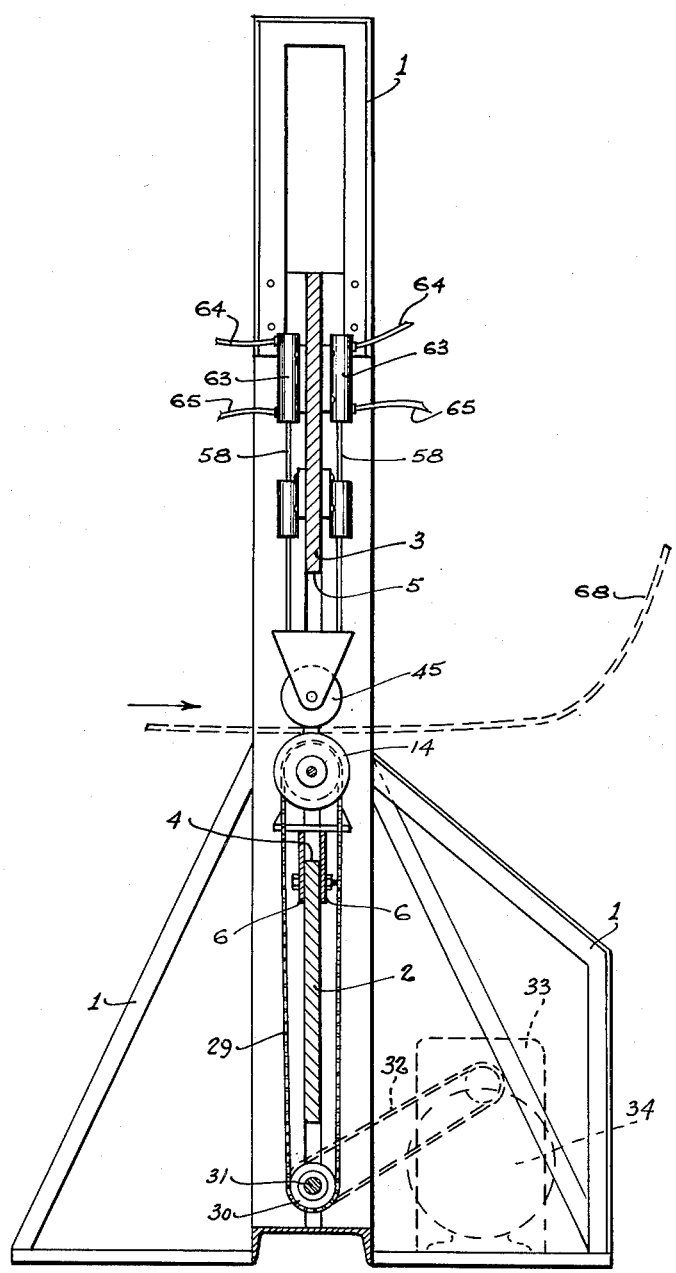
Fig. 2 is a section of the press seen in Fig. 1 taken on the line II—II.

Referring firstly to the general overall views seen in Figs. 1 and 2, the press consists of a frame 1 serving to support a pair of rigid mild steel plates 2 and 3 one above the other in a common vertical plane, each such plate extending transversely across an opening defined by the framework 1. The upper edge 4 of the lower plate 2 is concavely curved and the lower edge 5 of the upper plate 3 is correspondingly convexly curved, whereby these edges serve to define an arcuate aperture in which the nipper roll assemblies are positioned.

Centrally secured to the upper edge 4 of the lower plate 2 is a mounting 6 that serves to support an assembly of three power driven roll sections. Details of the structure of this assembly are seen on a larger scale in Figs. 5 and 6. The mounting 6 is itself an assembly of a pair of angle bars 7 each formed with a pair of slots 8 adapted to receive a bolt 9 whereby such angle bars 7 are secured to the plate 2. The angle bars 7 are in turn secured by screws 10 to support members 11 which carry at each end a pair of end plates 12 that serve as supports for the roll sections. These latter consist of three roll sections 13, 14 and 15 each formed of rubber in the conventional manner. The central roll section 14 is mounted on an annular core 16 to each side face of which there is secured a sprocket wheel 17. The core 16 is rotatably mounted by needle bearings 18 on a fixed central shaft 19 that is secured at each end by screws 20 to the end plates 12. The core 16 also carries a planet wheel 21 mounted on radially extending spindle 22. The outer roll sections 13 and 15 are respectively mounted on annular cores 23 and 24 which are mounted by needle bearings 25 and 26 on the fixed shaft 19. The side surfaces of the cores 23 and 24 that face inwardly towards the central core 16 carry circumferentially extending racks 27 and 28, the teeth of which engage the teeth of the planet wheel 21. The three roll sections 13, 14 and 15 are thus connected together in the manner of a differential gear mechanism.

Referring again to Figs. 1 and 2 it will be noted that the sprocket wheels 17 are each connected by chains 29 to further sprocket wheels 30 mounted on a shaft 31 journalled in the lower portion of the frame 1. The shaft 31 is driven through a belt 32 and reduction gearing 33 from a motor 34.

Arranged on each side of the central assembly of driven roll sections are further independently rotatable undriven roll sections. In Fig. 1, for example, there are shown three undriven lower roll sections 35, 36 and 37 on the left-hand side of the central assembly and similar undriven roll sections 38, 39 and 40 on the right-hand side of such assembly. Forming the upper nipper roll is a further series of roll sections 41, 42, 43, 44, 45, 46, 47, 48 and 49. All these upper roll sections are undriven as far as the direct application of external power is concerned, being caused to rotate in use solely as a result of frictional engagement with the glass. They are generally similar in construction to each of the undriven lower roll sections, except that, in keeping with normal practice, the diameter of the upper roll sections is rather less than that of the lower roll sections. The reason for this lies in the longitudinal curvature of the glass which will be passed between the rolls with its concave surface uppermost with the result that a rather greater area of support will be required beneath the glass.

A typical undriven upper roll section 49 and part of a cooperating lower roll section 40 are illustrated in Figs. 3 and 4. Each section consists of an outer rubber portion 50 secured to a central supporting core 51 that serves to mount the roll on a fixed hollow shaft 52 by means of needle bearings 53. The shaft 52 is secured by screws 54 to a pair of side plates 55 which in turn are secured by screws 56 to a cross member 57. At each end the cross member 57 is formed with a boss receiving the lower end of a rod 58. The cross member 57 is such a length that the two rods 58 straddle the lower edge 5 of the upper plate 3 and extend each along one side of such plate 3. Each rod 58 is supported in a sliding ball bushing 59 mounted in a housing 60 secured to the plate 3 by means of bolt 61, and terminates in a piston 62 arranged inside a pneumatic cylinder 63 secured to the plate 3 by means of bolts 66. Supply pipes 64 and 65 feed air under pressure as required to one or other end of each of the cylinders 63.

Figs. 3 and 4 also serve to show the relative positions of the upper roll section and a typical undriven lower roll section 40, a sheet of laminated glass 68 being shown passing therebteween. The structure of each of the lower undriven roll sections will be identical with that of the upper roll sections, being similarly supported by sliding ball bearings and urged by pneumatic cylinders.

The arrangement of a series of such undriven lower roll sections is best appreciated from Fig. 1 showing each of the sections 35 to 49 as independently urged by a pair of pneumatic cylinders 63 each acting as before through a rod 58 supported by sliding ball bushing 59 contained in housing 60, each part being duplicated on the rear side of the press in the manner demonstrated by Figs. 2 and 3.

The flexibility of operation of a nipper roll press of the type described above will be immediately obvious from Fig. 1. This figure shows a sheet of laminated glass 68 of comparatively gentle transverse curvature passing through the bite between the rolls. It will be appreciated that by means of this arrangement almost any degree of transverse curvature can be accommodated provided it becomes physically possible to mount all the upper pneumatic cylinders close enough to one another while still providing a sufficiently distributed pressure on the glass surface.

Figure 12 serves to illustrate in simplified diagrammatic form a typical pneumatic system for use with a nipper roll press of the type illustrated in Figures 1 and 2. All the pipes 64 both of the upper and lower cylinders 63 are connected together and to a main air supply pipe 69. The pipes 69 are supplied with air through a three-way valve 72 from a compressor 70 driven by a motor 71. Similarly the pipes 65 are connected together through a common pipe 73 which receives air from the compressor 70 through a second three-way valve 74. It will be seen that when the valve 72 is placed in the position to admit pressure air from the compressor 70 to the cylinders 63 to exert a squeezing pressure on the glass, substantially the same air pressure will be applied to all the pistons. The result of this type of operation is that a comparatively large squeezing pressure can be exerted on the glass while each pair of undriven upper and lower roll sections is capable of vertical sliding movement as a unit on the application of an external force substantially less than that required to separate the roll sections. This effect is achieved because resistance to movement in say the upward direction provided by one of the upper cylinders 63 will be largely counteracted by the upward force exerted by the corresponding lower cylinder. Air displaced out of the upper cylinder can flow into the additional space below the piston in the lower cylinder. Thus, theoretically, only frictional forces are involved in preventing displacement of each pair of roll sections as a unit, and the use of ball bushings is most effective in reducing translatory friction. This independent freedom of movement of each cooperating pair of roll sections permits the press to make allowance for variations of glass contour experienced as the glass travels through the press.

While the valve 72 is turned to the position to admit air pressure to the outer ends of the cylinders 63 to move the roll sections towards one another, the valve 74 will have been placed in its exhausting position, i.e. connecting the pipes 65 of the various cylinders 63 to atmosphere. When it is required to release the glass, and move the nipper rolls apart, the positions of the valves 72 and 74 will be interchanged, air being admitted from the compressor 70 to the inner ends of the cylinders 63 through the valve 74 while the valve 72 allows air from the outer ends of the cylinders 63 to exhaust to atmosphere.

The squeezing pressure and the extent of the frictional drag between the glass and the undriven roll sections will be capable of regulation by means of the air pressure supplied to the cylinders 63. A main reducing valve 75 will be provided for this purpose between the compressor 70 and the control valves 72 and 74.

A further possibility is that of employing alternating air pressure, that is to say a cyclic application of air pressure (pressure exerted for say ⅔ of a second and relaxed for ⅓). Periodic relaxation of the pressure can be expected to permit the roll sections more readily to adjust their positions relative to adjacent pairs of roll sections. For this purpose, it would only be necessary periodically to switch the valve 72 from its air admitting position to its exhausting position. The valve 74 could remain in its normal exhausting position, because it would not be desired to move the roll sections away from the glass but merely to relax instantaneously the squeezing pressure and provide a reduction in the frictional forces which in practice tend to prevent the movement of each pair of roll sections as a unit notwithstanding the above mentioned theoretical considerations. A diagrammatic representation of a motor and gearing assembly 72' which will serve to provide the required oscillation of the valve 72 is shown in broken lines in Fig. 12. Alternatively, or additionally, the air pressure may be biased to give a slight excess in certain roll sections and these roll sections could be conveniently the lower ones in order to compensate for the weight of the glass and other parts.

These considerations do not apply to the three lower centre rolls that are driven, as these are rigidly fixed to the lower plate 2 and the pressure in the three cylinders 63 acting on the rolls 44, 45 and 46 will solely determine the squeezing pressure on the glass.

It has always been believed that in order to produce satisfactory laminated safety glass it is necessary during the nipper roll pressing stage to press over all the surface or substantially all the surface of the glass. It has now been discovered, and it is chiefly this discovery which leads to the practicability of the present invention, that it is sufficient if the glass is pressed over a number of spaced areas. The spacing that can be tolerated will depend to some extent on the thickness of the glass. In a typical example employing roll sections having a width of 1 9/16", satisfactory operation has been obtained pressing a glass sandwich of nominal thickness of ¼", with the roll section centrelines spaced 2¼" apart. This resulted in a rubber to rubber span of 11/16". It is this allowable spacing which permits the inclined arrangement of successive pairs of roll sections which effectively produces a pair of nipper rolls with a curved contour.

The present method of constructing a nipper roll press provides other aspects of flexibility. With such a press it is quite practical to commence rolling from the centre of an elongated sheet of glass. Thus, the rolls may be separated in the manner already described; the glass placed centrally in position approximately as seen in broken lines in Fig. 2; the pneumatic pressure reapplied to clamp the glass between the roll sections; and then the driving motor 34 started to turn the driven roll sections 13, 14 and 15. After rolling out to one end of the sheet it would then be reversed and rolled again from the centre to the other end.

In such an arrangement where there is no common power transmission to the roll sections it is unnecessary for the sections of any one roll to be of the same diameter or even approximately the same diameter as one another. For example, the central roll sections 13, 14 and 15 could, if desired, be of a much larger diameter than the sections 35 to 40 on either side of them which constitute the remainder of the lower roll. The effect of this type of construction would be to provide a larger area of glass under pressure at any one time at the central area of the sheet than at the lateral edges. A diagrammatic illustration of the type of individual pressure areas 76 that would be obtained is illustrated in Fig. 7, while Fig. 8 shows a diagrammatic plan view of a lower roll with enlarged central roll sections 13', 14' and 15', that would provide such a pressure pattern. The total effective pressure area on the glass sheet 68 could be represented by the envelope 77 shown in broken lines. The upper roll section diameters would preferably be correspondingly increased to provide substantially uniform ratio between lower and upper roll section diameter along the full length of the roll.

Fig. 9 shows an alternative method of mounting the independent roll sections. In this figure the method of mounting is shown as applied to the section 40 of the lower roll. This modification involves the use of a pair of springs 80 as alternative means for exerting pressure on the roll section in replacement of the pneumatic cylinders. Each spring 80 is connected at one end to an end of a movable bar 81 and at the other end to a member 82 secured to the casing 83 of a first sliding ball bushing 84. Further ball bushings 85 are mounted in similar casings 86 and serve with the first bushings 84 to support rods 87 which correspond to the rods 58 of the previous embodiment. These rods are connected at their lower ends to the bar 81 and at their upper ends to the cross member 57 carrying the lower roll section 40.

This method of spring suspension may be employed entirely in replacement of the pneumatic type of operation illustrated in Fig. 1, or may be mixed with such pneumatic type of operation. The pneumatic type of operation has features which render it suited to use toward the central area of the glass sheet, that is for the central roll sections, whereas the spring urged type of mounting which provides a softer squeezing pressure but still sufficient for the peripheral areas of the glass, is preferred at the sides of the press. Thus a combination of the two types of mounting can be arranged as shown in Fig. 10 which shows a view otherwise similar to Fig. 1.

To illustrate entire replacement of pneumatic operation Figure 11 shows a nipper roll press in which all the slidably mounted rolls are spring urged in the manner of Figure 9. When an all-spring type of operation such as that shown in Figure 11 is adopted, it is preferred to grade the spring pressures by using heavier and stronger springs towards the centre of the row of roll sections and progressively lighter springs exerting less pressure towards the ends of the rows of roll sections. The chief merit in the use of spring operation is a noticeably reduced frictional impedance to vertical movement of a pair of roll sections as a unit. In common with the pneumatic form of operation, the use of springs enables each pair to be moved vertically as a unit by a much smaller force than would be required to separate the individual roll sections of that pair.

Moreover, the spring type of operation has a selfcentering feature not found in the pneumatically urged roll sections. If a pair of roll sections is displaced from the central position, the stress in one pair of springs 80, say the lower pair, will be increased and the stress in the corresponding upper pair of springs 80 will be similarly decreased so that the pair of roll sections will automatically move upwards to take up a central or equilibrium position. The relationship between the various equilibrium positions of the different pairs of roll sections can readily be adjusted by control of the spring tensions with the result that the roll sections can be caused to centre themselves automatically to define a curved or irregular contour.

To assist in rolling glass sheets having short radius bends, such as wrap-around windshields, the whole press may be mounted to tilt about an axis passing through the contact line between the center pair of roll sections. This possibility is illustrated diagrammatically in Figs. 13 and 14 where the frame 1 is shown mounted in bearings 88 supported in a fixed outer frame 89. These bearings are such that the whole press frame can also rise and fall in accordance with the requirements of the glass contour, the bearings 88 sliding vertically in the outer fixed frame 89.

If it is desired to exercise some control over the degree of relative movement between each adjacent pair of roll sections, the structure illustrated in Fig. 15 may be adopted. Fig. 15 shows a flexible inflatable hose 90 extending between three roll sections 47, 48 and 49 of the upper roll, passing through each of the hollow shafts 52 on which such roll sections are rotatably mounted. The hose 90 will permit a considerable degree of relative movement between adjacent roll sections, but will nevertheless exercise some control limiting such movements, the extent of this control being determined by the flexibility of the hose, a factor that can be varied as required from time to time by the air pressure supplied to the hose 90 through pipe 91.

Figure 16:
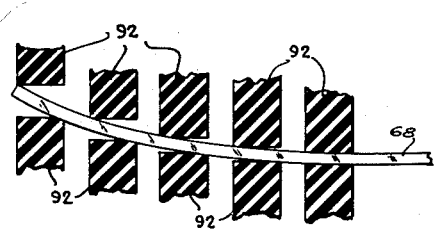
Figs. 16, 17 and 18 are a series of sketches illustrating the effect of varying the number and width of roll sections in the pressing of glass having a transverse curvature.
Figure 17:
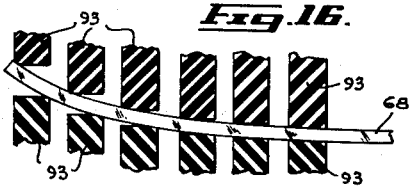
Figure 18:
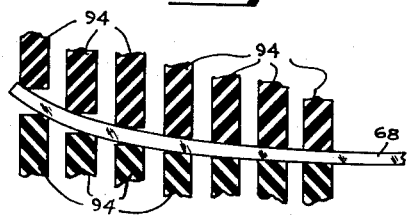

Figures 16 to 18 are employed to illustrate diagrammatically the effect of the number and width of roll sections on the rolling of a glass sheet of transverse curvature. Figure 16 shows five pairs of roll sections 92 commencing from approximately the centre of the glass sheet 68. In Figure 17 six roll sections 93 somewhat narrower than the roll sections 92 are employed to roll substantially the same area of the glass sheet 68, and finally in Figure 18 seven roll sections 94 are shown in the course of rolling a similar area of the sheet 68. The roll sections 94 are again reduced in width in relation to the roll sections 93. The effect of the width of each roll section (more particularly those towards the ends of the row) on the curved up edge portions of the glass, is apparent from these diagrams. The extreme roll 92 in Figure 16 will exert a greater bending moment on the edge strip of glass than that that will be exerted by the end roll section 93. In turn the end roll section 94 will exert a somewhat smaller bending moment thus having less tendency to fracture the edge of the glass. It is found in practice that bending force of this type can usually be tolerated to some extent, but they will often have the effect of reducing the effective squeezing pressure that can be employed. Moreover, less efficient rolling of the glass at its edges may be the result.

Various modifications may be made to the peripheral structure of one or more of the roll sections, more particularly those at the end of a row of roll sections, in one or other of the manners illustrated in Figures 19 to 23.

Figure 19 shows a fragment of a pair of roll sections 95, the outer peripheral surfaces of which are frustoconical. It will be noted how these surfaces by suitable choice of their inclination may be caused accurately to contact the contour of the glass sheet 68. This type of construction is admirably suited to a nipper roll press designed to receive only one shape of glass. If a nipper roll that is to be more versatile in the sense of being suited to the pressing of varying glass contours, is required, the structure of one or other of Figures 20 to 22 may be preferred.

Figure 20 shows a fragment of a roll section 96 which is formed with four parallel, circumferentially extending tongues 97 made sufficiently narrow to be readily deformable from their normal position and thus more adapted to accommodating themselves readily to a glass contour not parallel with a tangent to the normal peripheral roll surface in its unstressed condition.

The roll section 98 seen in Figure 21 has a somewhat similar pair of readily deformable tongues 99 formed at its peripheral edge surfaces by a pair of circumferential grooves 100 formed on the opposite side surfaces of the roll section 98 adjacent its edges.

Figure 22 illustrates a further modified roll section 101 which is formed with a hollow outer peripheral portion 102 arranged to be suitably inflated in the manner of a pneumatic tire.

Each of these three structures of Figures 20, 21 and 22 will be more readily capable of engaging an inclined glass contour with a large portion of their peripheral surfaces than would be a simple roll section of normal cylindrical configuration.

Should mechanical reasons, such as the arrangement of a number of adjacent pneumatic cylinders or spring devices side by side, require the actual rubber portions of the roll sections to be too far apart for efficient rolling of the glass, a type of peripheral contour such as that illustrated in Figure 23 can be adopted. This figure shows a pair of adjacent roll sections 103 each formed on its peripheral surface with a wide, shallow, concave groove 104 serving to define on each peripheral edge surface a circumferentially extending tongue 105. When the roll sections are pressed against the glass, the tongues 105 will be spread outwardly into substantially the positions shown in broken lines so that adjacent tongues of the neighbouring roll sections move together and serve to form an almost continuous roll in operation.

Throughout the description to this point it has been assumed that any elongated sheet of glass such as an automobile windshield will be rolled in its longitudinal direction. That is to say either one end of the glass will be inserted into the bite between the rolls and the sheet passed in its longitudinal direction through the rolls, or the rolls will be brought down onto the centre of the sheet after it has been originally placed in such position between the rolls. This manner of rolling elongated curved glass sheets is a natural development from the type of rolling operations carried out before compound bends became commonplace in glass sheets. The general flexibility of operation afforded by the present invention, the designer of the press having a much greater freedom in his choice of positioning of roll sections, enables a new approach to the rolling of elongated sheets to be adopted. That is to say it is no longer essential that the sheet should be rolled longitudinally. It may be rolled transversely, and Figure 24 has been provided as a diagrammatic illustration of this type of operation, this figure showing approximately half of a wrap-around windshield 106 positioned between a series of upper roll sections 107 and lower roll sections 108.

When the method of operation of Figure 24 is employed with an elongated laminated glass sheet such as a windshield having a simple curvature in the longitudinal direction and no transverse curvature, there will be no effective change in contour of the glass sheet as the same passes through the roll sections. Although this aspect of the invention is fully applicable to the preliminary pressing of sheets having simple longitudinal curvature, it is perhaps more likely to find special advantage in the pressing of elongated sheets having curvature both in the longitudinal and transverse directions. The longitudinal curvature will normally be of shorter radius than the transverse curvature so that by means of the present method of rolling, the sharper curvature will have already been taken care of by the inclination and relative dispositions of the roll sections, these sections only being called upon to take care of the relatively gentle transverse curvature of the glass as the passage thereof through the nipper rolls proceeds.

Figure 25 illustrates a further modification in which the roll sections although still in effect arranged in pairs are not directly opposed to one another on opposite sides of the glass sheet, the upper roll sections 109 being in staggered relationship to the lower roll sections 110. Their manner of pressing on a glass sheet 111 is evident from Figure 25. These roll sections are also shown as incorporating the frusto-conical peripheral surface feature of Figure 19, the angle of conical inclination of each roll section being graduated to follow the glass contour.

Referring now to Figures 26 to 28, these illustrations will be seen to show a wooden framework 201 having an upper contoured surface 202 of convex shape adapted to conform, at least around the periphery, to the inner concave surface of a first glass sheet 203. It is clearly not necessary that the frame 201 should support the sheet 203 over its entire surface; what is essential is that it should provide a firm support on which this sheet may be conveniently held in its inverted position. For convenience of reference, the term "inverted" is used herein to mean a curved sheet, such as the sheet 203, positioned generally horizontally and with its convex surface uppermost.

Although not visible in Figure 26, it is to be assumed that a second sheet of glass will previously have been positioned on the frame 202 and that, at the stage in the process that this figure illustrates, such second sheet will have been elevated clear of the lower sheet 203 to allow easy access thereto.

As is shown in Figure 27, the next step in the process is that the operator lays a thin sheet 204 of the flexible interlayer material over the glass sheet 203. The comparative ease with which the operator can place this interlayer sheet 204 on the glass sheet 203 and with which he can smooth the sheet 204 down to conform accurately with the contour of the underlying sheet 203 can be readily imagined from Figure 27. It will also be apparent that there will be no tendency for the ears 205 of the interlayer sheet 204 to move from their positions at the ends of the sheet 203 once they have been placed there by the operator.

Figure 28 shows the completion of the stacking stage of the process with the second sheet of glass 206 being lowered into position by means of vertically movable suction cups 207 to lie on top of the interlayer 204 and form the required unit of glass sheets and interlayer.

The frame 201 with this unit still in position thereon is then passed on to a nipper roll press. Here the unit is lifted off manually still in its inverted orientation and fed between the rolls of the press.

The main features of a nipper roll press are shown in front view in Figure 29. For an understanding of the present invention, it will only be necessary to consider the form and nature of the two nipper rolls 208 and 209 which are mounted in bearings shown generally at 220 and are urged together in a conventional manner, as by springs. It is assumed that the rolls 208 and 209 are cylindrical, or at least cylindrical when pressed together. The various modifications to this basic form of nipper roll that have been proposed, including conical rolls and the sectionalized rolls described in connection with Figures 1 to 25, may be combined with the feature now about to be described. But, since this feature, which is concerned with the relative diameters or hardness factors of the rolls, is equally applicable to the simple as well as the more complex roll structures, it is proposed initially to illustrate the same with reference to simple cylindrical rolls.

In accordance with one embodiment, the upper roll 208 is made of larger diameter than the lower roll 209. This embodiment is illustrated in Figures 29, 32 and 34. Referring principally to the sectional view of Figure 32, it will be seen that where the surfaces of the rolls 208 and 209 meet they are squeezed over an area that as well as extending along the roll is defined by a curved transverse imaginary line, here designated by the reference numeral 210. This area of contact is formed when the rolls meet in the absence of a glass sheet between them. Because the lower roll 209 is of smaller diameter (say 5½ inches) than the upper roll 208 (8 inches), the curved line 210 has its convex side uppermost, although the curvature of the surface defined by the line 210 will not be as great as that of the lower roll 209. That is to say there will be some distortion or flattening of the roll 209 where the rolls are in peripheral engagement, just as there will be a flattening of the upper roll 208. By reason of the relative diameters of the rolls however this flattening will be less effective in the case of the roll 209 than in the case of the roll 208 so that the roll 209 will remain convex while the roll 208 will be depressed beyond a true flat surface to exhibit a slightly concave configuration.

The effect of these relative roll diameters when a laminated glass panel 211 is passed between the rolls is seen in Figure 34. Both rolls tend to conform to the curvature of the glass so that an upper concave surface 212 is formed along the lower edge of the upper roll 208 while a corresponding convex surface 213 is formed opposite the surface 212 on the upper perimeter of the lower roll 209. The curvatures of the surfaces 212 and 213 will be substantially the same as one another and will conform to the contour of the glass 211. Moreover, if the rolls are ideally suited to the glass, the curvature of the surfaces 212 and 213 will be the same as the curvature of the line 210 which resulted from the rolls being pressed together without the glass between them (Figure 32).

It will be appreciated that it is impractical to design the rolls so that the curvature of the line 210, which will be unique for any one set of roll conditions, will be correct for every part of the glass surface, unless the curvature of the glass is uniform throughout its full extent in its direction of travel. In practice it is seldom that such uniformity of curvature exists. In the most common example of laminated panels, namely that of automobile windshields, there is a marked change of curvature between the central portion of the glass and the two sharply bent sections joining the end ears to the central portion. It is usually found desirable to design the rolls so as ideally to accommodate the sections of glass having the shortest radius of curvature, so that there will be no resultant stress tending to fracture the glass at these points. It is found in practice that the fact that the curvature of the line 210 is unnecessarily great for the more gently curved surfaces of the glass, does not give rise to serious difficulty.

It will be noted from Figure 34 that the width of the surface 212 is substantially greater than that of the surface 213 so that additional support is provided for the glass adjacent its convex surface. This is a further factor leading to the passage of the glass through the rolls with a minimum of undesirable stress likely to lead to damage or fracture.

In accordance with a second embodiment of the invention illustrated in Figures 31, 33 and 35, the desired natural curvature of the area of contact of directly engaging surfaces of the rolls is obtained by virtue of a difference in the nature of the rubber of the two rolls rather than by means of a difference in roll diameter. Figure 33 shows a surface defined by a curved line 214, this surface being that of contact of a pair of rolls 215 and 216, the line 214 being curved exactly similarly to the line 210 notwithstanding the fact that the rolls 215 and 216 are of the same diameter. As shown by Figure 35, this enables the rolls to conform naturally to surfaces 217 and 219 similar to the surfaces 212 and 213 when the glass panel 211 is passed between the rolls.

This latter effect is obtained by a differential of hardness between the rolls 215 and 216. These rolls will be conveniently formed of the tough rubber conventionally used for this purpose, but whether rubber or some other material is used their ease of deformation may be measured in accordance with the scale known as "Shore" durometer. For example in the first embodiment described, where the upper roll was made 8 inches in diameter and the lower roll was given a diameter of 5½ inches, the two rolls would normally be constructed of similar material having a hardness of say 30 to 35 durometer on the Shore scale. (It is not a practical matter to predetermine the hardness of a batch of material more closely than within certain limits, so that hardness is commonly expressed as a range rather than an exact amount.) In the second embodiment described in Figures 31, 33 and 35, in which both the upper and lower rolls are made with the same diameter (say 5½ inches), a pair of nipper rolls suitable for the preliminary pressing of wrap-around windshields as at present in common use would be provided if the upper roll were formed with a hardness of 10 to 15 durometer on the Shore scale while the lower roll had a hardness of from 40 to 45 durometer on the Shore scale.

As will be immediately apparent, basically the same effect is produced by the two embodiments of the invention and an infinite variety of further embodiments is possible combining to different degrees the two variables. For example, a smaller difference between the roll diameters than in the first embodiment could be used with a smaller difference between the hardnesses than in the second embodiment. Thus an upper roll of 7 inches diameter and 20 to 25 durometer would be a satisfactory complementary roll to a lower roll of 5½ inches diameter and a durometer of from 30 to 35.

As above mentioned the invention is equally applicable to complex roll forms in which the diameter of each roll will not necessarily be constant. In this case it will be convenient to consider the mean diameter of the roll as measured from end to end. Correspondingly, the rolls, especially if formed as series of separate roll sections, may be of varying hardness in the longitudinal direction. It would normally be convenient to have rather harder sections at the centre of the glass and softer sections towards the lateral edges. The criterion for the production of a natural upward curvature of the engaging roll surfaces would then be a softer portion of upper roll pressed into engagement at each point along the roll with a harder portion of lower roll. As a practical matter it is sufficient to consider the upper roll overall and simply call for a lesser mean hardness than that of the lower roll, it being understood that deviations from this mean in one roll will be mirrored in the other roll.

Figure 36 shows an application of the inverted method of rolling applied to a press employing sectionalised nipper rolls in the manner of Figure 1 and also embodying the transverse feeding feature of Figure 24.

Figure 36 shows a frame 121 supporting a pair of rigid mild steel plates 122 and 123 arranged one above the other in a common vertical plane. The upper edge 124 of the lower plate 122 is convexly curved and the lower edge 125 of the upper plate 123 is concavely curved whereby these edges serve to define an upwardly bowed aperture in which the nipper roll assemblies are positioned. The lower nipper roll is comprised of roll sections 126, 127, 128, 129, 130, 131, 132, 133, 134, 135, 136, 137 and 138. The upper nipper roll is formed of a central group of three roll sections 139, 140, and 141 flanked on one side by a further group of roll sections 142, 143, 144, 145 and 146 and on the other side by a similar group of roll sections 147, 148, 149, 150 and 151. The central upper group of roll sections 139, 140 and 141 are secured as a group to the plate 123 against any movement other than rotation about their own axis. All the remaining roll sections are slidably mounted in longitudinal ball bushings 152 by means of rods 153. Each rod 153 terminates in a piston (not shown) arranged in a pneumatic cylinder 154, or, in the manner previously described, some or all of these pistons may be replaced by springs. As in the previous embodiments, the roll sections are arranged in opposed pairs and their manner of translatory movement under the control of a pneumatic system or springs is exactly similar to that already fully described. Power is introduced into the system through shaft 155, sprocket wheels 156 and chains 157 which serve to drive the roll sections 139, 140 and 141.

This figure also demonstrates the manner in which such sectionalized nipper roll press may be employed to roll a laminated unit 158 transversely, i.e. with the longitudinal axis of such unit extending parallel to the nipper roll axes. If the laminated unit 158 has a compound bend, that is to say a transverse as well as a longitudinal curvature, the longitudinal curvature will be taken care of by the relative positions of adjacent pairs of roll sections and the press can be made to accommodate the transverse curvature by making the upper roll sections of greater diameter or of softer material, or both, than the lower roll sections, in the manner previously described. On the other hand, if the unit 158 does not have a compound curvature, but merely a simple longitudinal curvature, no such relative roll section conditions would be necessary. In the press illustrated in Figure 36, the driven roll sections are shown as part of the upper nipper roll. This type of drive has been adopted because the unit 158 is passed through with its convex side uppermost. This is not, however, an essential feature, and the central group of roll sections of the lower roll could constitute the driven roll sections in a like manner to that shown in Figures 1, 10 and 11.

The use of a sectionalized type of nipper roll lends itself particularly favourably to the adoption of different hardnesses for the various roll sections. It is found that improved operation is obtained, if the roll sections towards the centre of the roll are made of comparatively hard rubber in comparison with the roll sections towards the end of each roll. The roll hardness may be graded in more than one stage outwardly from the centre. For example, the three centre roll sections might have a hardness of 30 to 35 Shore durometer; the next two rolls on each side of the centre group could have a hardness of 20 to 25 Shore durometer and the extreme outside roll sections on each end of the roll have a hardness of 10 to 15 Shore durometer. This enables the roll sections at the ends of the rolls to accommodate themselves better to variations of glass contour while at the same time ensuring adequate rolling pressure. It also enables a rather firmer pressing action to be applied to the centre of the glass, to ensure that air is squeezed outwardly from the centre.

I claim:

1. A nipper roll press for the preliminary pressing of curved laminated glass sheets, wherein the nipper rolls take the form of two generally parallel rows of separate roll sections arranged in side-by-side relation, at least one pair of peripherally opposed roll sections in peripheral pressure engagement with each other being rectilinearly movable as a unit relatively to the remaining roll sections in the direction substantially normal to the plane occupied by a glass sheet lying between said rolls.

2. A nipper roll press for the preliminary pressing of curved laminated glass sheets, wherein the nipper rolls take the form of two generally parallel rows of roll sections, each roll section of the first row being in peripheral pressure engagement with a roll section of the other row whereby to form a series of pairs of cooperating roll sections, with said pairs arranged in side-by-side relation, at least one of said pairs being rectilinearly movable as a unit relatively to and independently of the remaining said pairs in the direction of the forces exerted by the roll sections of said movable pair on each other.

3. A nipper roll press for the preliminary pressing of curved laminated glass sheets, comprising a series of pairs of opposed roll sections normally in peripheral engagement with each other, said pairs being disposed in side-by-side relation to form the equivalent of a pair of nipper rolls, and means mounting at least some of said roll sections separately from other said roll sections for independent rotation and independent translation normal to the plane occupied by a glass sheet lying between said rolls.

4. A nipper roll press as claimed in claim 3, including fluid-pressure-operated means for urging the roll sections of a said pair thereof together in the direction normal to the plane occupied by a glass sheet lying between said rolls.

5. A nipper roll press as claimed in claim 4, including means for periodically instantaneously relaxing said fluid-pressure-operated means to permit realignment of said roll sections and thus facilitate conformation to glass contour.

6. A nipper roll press as claimed in claim 3, including spring means for urging the roll sections of a said pair thereof together in the direction normal to the plane occupied by a glass sheet lying between said rolls.

7. A nipper roll press for the preliminary pressing of curved laminated glass sheets, wherein the nipper rolls take the form of two arcuate rows of roll sections, each roll section of the first row being in peripheral pressure engagement with a roll section of the other row to form a pair, said last-mentioned roll section having an axis of rotation parallel to the axis of rotation of the roll section with which it is in peripheral pressure engagement, the direction of such pressure being transverse to said axes, the roll sections of said rows forming a series of such pairs of cooperating roll sections, said pairs being arranged in side-by-side relation, at least one of said pairs of roll sections being rectilinearly movable as a unit relatively to and independently of the remaining said pairs in the direction of the forces exerted by the roll sections of said movable pair on each other.

8. A nipper roll press for the preliminary pressing of curved laminated glass sheets, comprising a pair of spaced support members and a pair of nipper rolls in the form of two generally parallel rows of separate roll sections, each roll section of the first row being in peripheral pressure engagement with a roll section of the other row whereby to form a series of pairs of cooperating roll sections arranged in side-by-side relation, a group of centrally positioned roll sections of said first row being firmly mounted on a first said support member, the remaining roll sections of said first row being mounted on said first support member for translatory motion independently of one another in the direction of the forces exerted by such roll sections on the roll sections of the second row, and the roll sections of said second row being mounted on the second said support member for translatory motion independently of one another in said direction.

9. In a nipper roll press for the preliminary pressing of curved laminated glass sheets, a first arcuate row of roll sections defining a first nipper roll, a second complementary arcuate row of roll sections defining a second nipper roll, each roll section of the first row being in register with a corresponding roll section of the second row, a frame, at least one of said roll sections of said first row being positioned on said frame for rotation about a fixed axis, power means connected for positively driving said roll sections positioned on said frame, means mounting the remaining roll sections on said frame for free rotation and independent rectilinear motion, means urging those roll sections of the second row cooperating with the frame-positioned roll sections of the first row into peripheral pressure engagement therewith, and means urging each of the remaining roll sections into peripheral pressure engagement with each other in pairs.

10. A nipper roll press as claimed in claim 9 including a fixed support and means mounting said frame in said support for vertical sliding motion and for rotation substantially about the line defined by the engaging surfaces of said nipper rolls.

11. In a nipper roll press, a pair of roll sections arranged in side-by-side relation, means mounting said roll sections for independent translatory motion relative to one another, a hollow flexible member interconnecting said mounting means effective to limit said motion, and means for inflating said member to a desired extent whereby to control the flexibility thereof.

12. A nipper roll press for the preliminary pressing of curved laminated glass sheets, wherein the nipper rolls take the form of two generally parallel rows of separate roll sections including a shaft for mounting each roll section for rotation about the axis of the shaft, at least some of the roll sections of one row being staggered in relation to the roll sections of the other row, said roll sections being so constructed and arranged that, when a glass sheet is between the rows a roll section of the first row cooperates with a roll section of the second row that is adjacent to but staggered from said roll section of the first row to form a pair of effectively peripherally cooperating roll sections, said pair being rectilinearly movable as a unit relatively to the remaining roll sections in a direction substantially normal to the plane occupied by said glass sheet.

13. A method of carrying out a preliminary pressing operation in a nipper roll press on an elongated laminated glass sheet, comprising separating the nipper rolls of said press, positioning the said glass sheet between said rolls, moving said rolls together to exert a squeezing pressure on both sides of a first area of said sheet intermediate its ends, said area extending across the entire width of the sheet, driving at least a portion of one of said rolls to cause said glass sheet to travel longitudinally therethrough until a first end of said sheet has passed beyond said rolls, again separating said rolls, repositioning said sheet between said rolls, moving said rolls together to exert a squeezing pressure on both sides of a second area of said sheet intermediate its ends and no nearer the second end of said sheet than said first area, said second area extending across the entire width of the sheet, and driving at least a portion of one of said rolls to cause said sheet to travel longitudinally therethrough until the second end of said sheet has passed beyond the rolls.

14. A method of carrying out a preliminary pressing operation on an unbonded unit comprising a pair of identically curved elongated glass sheets, each curved in its longitudinal direction to include at least one sharply bent portion, and an interlayer sheet of synthetic resinous material sandwiched between said pair of glass sheets, comprising passing said unit through a nipper roll press in the direction transverse to the longitudinal extent of said unit and with the convex surface of said unit uppermost.

15. In a nipper roll press, a first and a second roll section, a first shaft mounting said first roll section, means mounting said first shaft in fixed position, a second shaft separate from said first shaft mounting said second roll section in side-by-side generally coaxial relationship with said first roll section, means mounting said second shaft for straight line sliding motion relatively to said first shaft in a direction transverse to the axis of said second shaft, and a flexible member interconnecting said shafts effective to limit said sliding motion.

16. In a nipper roll press, two opposed pairs of roll sections arranged in side-by-side generally coaxial relation, and means mounting one of the roll sections of one pair of roll sections for translatory motion in a direction transverse to its axis relative to the other roll section of said one pair of roll sections and wholly independently thereof, and means mounting said other roll section of said one pair of roll sections in fixed position.

17. In a nipper roll press, sets of opposed cooperating roll sections, said sets being arranged in side-by-side relation, means mounting the roll sections of each set for sliding movement along a common axis, means connected to each said mounting means for urging a roll section of a set into peripheral pressure engagement with an opposed roll section of the set, said mounting means being such that said set of opposed roll setions may be displaced as a pair along said axis by the application of an external force less than that required to separate said roll sections.

18. In a nipper roll press, sets of opposed cooperating roll sections, said sets being arranged in side-by-side relation, means mounting the roll sections of each set for sliding movement along a common axis, fluid-pressure-operated means connected to each said mounting means for urging a roll section of a set into peripheral pressure engagement with the other roll section of the set, and a common fluid system, said fluid-pressure-operated means being connected to said common fluid system whereby said set of roll sections may be displaced as a pair along said axis by the application of an external force less than that required to separate said roll sections.

19. In a nipper roll press, two opposed pairs of roll sections, one of said pairs of roll sections comprising a first roll section and the other of said pairs of roll sections comprising a second roll section, a first shaft mounting said first roll section, means mounting said first shaft in fixed position, a second shaft separate from said first shaft mounting said second roll section in side-by-side generally coaxial relationship with said first roll section, and means mounting said second shaft for translatory motion relatively to and independently of said first shaft in a direction transverse to the axis of said second shaft.

References Cited in the file of this patent

UNITED STATES PATENTS

| | | |
|---|---|---|
| 492,613 | Pierce | Feb. 28, 1893 |
| 530,421 | Judd | Dec. 4, 1894 |
| 994,910 | Duesterhoff | June 13, 1911 |
| 1,334,588 | Bartelstone | Mar. 23, 1920 |
| 1,845,676 | McNamara | Feb. 16, 1932 |
| 1,960,580 | Fraser | May 29, 1934 |
| 1,992,976 | Watkins | Mar. 5, 1935 |
| 2,025,115 | Lytle | Dec. 24, 1935 |
| 2,182,358 | Sherts et al. | Dec. 5, 1939 |
| 2,231,857 | Delacuvellerie | Feb. 11, 1941 |
| 2,340,933 | Chilton | Feb. 8, 1944 |
| 2,379,220 | Englehart | June 26, 1945 |
| 2,470,461 | Black | May 17, 1949 |
| 2,514,320 | Fekete | July 4, 1950 |
| 2,525,980 | Walters | Oct. 17, 1950 |
| 2,554,988 | Hollis | May 29, 1951 |
| 2,612,079 | Mahler | Sept. 30, 1952 |
| 2,618,012 | Milne | Nov. 18, 1952 |
| 2,628,177 | Boicey et al. | Feb. 10, 1953 |
| 2,673,168 | Pascoe | Mar. 23, 1954 |
| 2,677,918 | Bird et al. | May 11, 1954 |
| 2,729,581 | Pascoe et al. | Jan. 3, 1956 |
| 2,829,587 | Russell | Apr. 8, 1958 |

FOREIGN PATENTS

| | | |
|---|---|---|
| 989,338 | France | May 23, 1951 |

OTHER REFERENCES

Moser: "Glass Bonding," Modern Plastics (February 1954); page 108 relied upon.